US009544381B2

(12) United States Patent
Zafarani et al.

(10) Patent No.: US 9,544,381 B2
(45) Date of Patent: Jan. 10, 2017

(54) USER IDENTIFICATION ACROSS SOCIAL MEDIA

(71) Applicants: Reza Zafarani, Tempe, AZ (US); Huan Liu, Tempe, AZ (US)

(72) Inventors: Reza Zafarani, Tempe, AZ (US); Huan Liu, Tempe, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 189 days.

(21) Appl. No.: 14/210,372

(22) Filed: Mar. 13, 2014

(65) Prior Publication Data

US 2014/0280592 A1 Sep. 18, 2014

Related U.S. Application Data

(60) Provisional application No. 61/779,171, filed on Mar. 13, 2013.

(51) Int. Cl.
*G06F 15/16* (2006.01)
*H04L 29/08* (2006.01)

(52) U.S. Cl.
CPC .................................... *H04L 67/22* (2013.01)

(58) Field of Classification Search
CPC ...... H04L 67/02; H04L 65/4084; H04L 47/62; H04L 67/22
See application file for complete search history.

(56) References Cited

U.S. PATENT DOCUMENTS

| 8,131,745 B1* | 3/2012 | Hoffman | G06Q 10/107 |
| | | | 707/766 |
| 8,271,894 B1 | 9/2012 | Mayers | |
| 2009/0327054 A1* | 12/2009 | Yao | G06Q 10/10 |
| | | | 705/12 |
| 2011/0231240 A1 | 9/2011 | Schoen et al. | |
| 2013/0124644 A1* | 5/2013 | Hunt | H04L 51/12 |
| | | | 709/206 |

OTHER PUBLICATIONS

Anshu Malhotra et al., "Studying User Footprints in Different Online Social Networks", Aug. 29, 2012, proceeding of IEEE/ACM International Conference on Advances in Social Networks Analysis and Mining, p. 1065-1070.*

(Continued)

*Primary Examiner* — Anthony Mejia
*Assistant Examiner* — Soe M Hlaing
(74) *Attorney, Agent, or Firm* — Norton Rose Fulbright US LLP

(57) ABSTRACT

Users may be identified across websites, such as social media websites. Prior user information data and candidate user information data may be received. An algorithm may identify a first plurality of behavioral patterns in the prior user information data and a second plurality of behavioral patterns in the candidate user information datum. The algorithm may determine whether the candidate user information datum and the prior user information data correspond to the same user based, at least in part, on the first and second pluralities of behavioral patterns.

19 Claims, 10 Drawing Sheets

(56) References Cited

OTHER PUBLICATIONS

Oana Goga et al., "Exploiting Innocuous Activity for Correlating Users Across Sites", May 2013, International World Wide Web Conference Committee, Proceedings of the 22nd international conference on World Wide Web, pp. 447-457.*
Abbasi, et. al., "Applying Authorship Analysis to Extremist-Group Web Forum Messages", IEEE Intelligent Systems, Sep./Oct. 2005, pp. 67-75.
Agrawal, et. al., "Privacy-Preserving Data Mining, ACM SIGMOD Record", Jun. 2000, vol. 29, Issue 2, pp. 439-450.
Amitay, et. al., "Serial Sharers: Detecting Split Identities of Web Authors, SIGIR Workshop on Plagiarism", 2007, paper 2, pp. 1-8.
Backstorm, et. al., "Wherefore Art Thou R3579X? Anonymized Social Networks, Hidden Patterns, and Structural Steganography", WWW Conference / Track: Mining Data, May 2007, pp. 181-190.
Bartunov et. al., "Joint Link-Attribute User Identity Resolution in Online Social Networks", The 6th SNA-KDD Workshop, Aug. 2012, pp. 1-9.
Bilge, et. al., "All Your Contacts Are Belong to Us: Automated Identity Theft Attacks on Social Networks", WWW 2009 Conference, Apr. 2009, pp. 551-560.
Chen, et. al., "An Empirical Study of Smoothing Techniques for Language Modeling", Computer, Speech and Language, 1999, 13(4), pp. 359-393.
Cilibrasi, et. al., "Clustering by Compression", IEEE Transactions on Information Theory, Apr. 2005, vol. 51 No. 4, pp. 1523-1545.
De Vel, et. al., "Mining E-mail Content for Author Identification Forensics", SIGMOD Record, Dec. 2001, vol. 30, No. 4, pp. 55-64.
Dinur, et. al., "Revealing Information while Preserving Privacy", SIGMOD-SIGACT-SIGART Symposium, PODS 2003, pp. 202-210.
Huang, Andrew (Bunnie), "Leaked in", Bunnies Blog, Jun. 2012, retrieved Mar. 2, 2015 from http://www.bunniestudios.com/blog/?p=2369, pp. 1-9.
Dunning, "Statistical Identification of Language", CLR Tech Report, Computing Research Lab, New Mexico State Univ., Mar. 1994, pp. 1-29.
Evfimievski, et. al., "Limiting Privacy Breaches in Privacy Preserving Data Mining", PODS Conference, Jun. 2003, pp. 1-12.
Ferguson, "Word Stress in Persian", Language, 1957, vol. 33, No. 2, pp. 123-135.
Habash, et. al., "On Arabic Transliteration", Arabic Computational Morphology, 2007, pp. 15-22.
Iofciu, et. al., "Identifying Users Across Social Tagging Systems", AAAI Conference on Weblogs and Social Media, 2011, pp. 522-525.
Keogh, et. al., "Towards Parameter-Free Data Mining", SIGKDD Conference, Seattle 2004, pp. 1-12.
Kumar, et. al., "Understanding User Migration Patterns in Social Media", Association for the Advancement of Artificial Intelligence (AAAI), 2011, pp. 1204-1209.
Levenshtein, "Binary Codes Capable of Correcting Deletions, Insertions, and Reversals", Soviet Physics-Doklady, 1966, vol. 10, No. 8, pp. 707-710.
Lin, "Divergence Measures Based on the Shannon Entropy", IEEE Transactions of Information Theory, 1991, vol. 37, No. 1, pp. 145-151.
Malhotra, et. al., "Studying User Footprints in Different Online Social Networks", Proceedings of CSOSN, 2012. pp. 1-6.
Miller, "The Magical Number Seven, Plus or Minus Two: Some Limits on our Capacity for Processing Information", Psychological Review, 1956, 63, pp. 81-97.
Muller, "Information Retrieval for Music and Motion", Springer Publishing, 2007.
Narayanan, et. al., "Robust De-anonymization of Large Sparse Datasets", IEEE Symposium on Security and Privacy, 2008, pp. 111-125.
Novak, et. al., "Anti-Aliasing on the Web", WWW Conference, 2004, pp. 30-39.
Palfrey, et. al., "Enhancing Child Safety & Online Technologies", Internet Safety and Technical Task Force, 2008.
Perlroth, "Verifying Ages Online is a Daunting Task, Even for Experts", New York Times, Jun. 17, 2012. Retrieved Mar. 2, 2015 from: http://www.nytimes.com/2012/06/18/technology/verifying-ages-online-is-a-daunting-task-even-for-experts.html?pagewanted=all&_r=1&pagewanted=print, pp. 1-4.
Recordon, et. al., "OpenID 2.0: A Platform for User-Centric Identity Management", DIM Conference, 2006, pp. 11-15.
Yan, et. al., "He Memorability and Security of Passwords—some Empirical Results", Technical Report, No. 500, University of Cambridge Computer Lab, 2000. pp. 1-11.
Vorvoreanu, "Managing Identity Across Social Networks", CSCW Conference, 2010, pp. 481-482.
Zafarani, et. al., "Connecting Corresponding Identities Across Communities", Proceedings ICWSM Conference, 2009, pp. 354-357.
Zafarani, et. al., "Connecting Users Across Social Media Sites: A Behavioral-Modeling Approach", WWW Conference, 2013, pp. 1-11.
Zheng, et. al., "A Framework for Authorship Identification of Online Messages: Writing-Style Features and Classification Techniques", Journal of the American Society for Information Science and Technology, 2006, 57(3), pp. 378-393.
Flake, et. al., "Efficient Identification of Web Communities", KDD Conference, 2000, pp. 150-160.
Hu, et. al., "Mining and Summarizing Customer Reviews", KDD Conference, 2004, pp. 168-177.
Zafarani et al., "Connecting Corresponding Identities across Communities", Arizona State University—Department of Computer Science and Engineering, 2009, Association for the Advancement of Artificial Intelligence.

* cited by examiner

USER IDENTIFICATION ACROSS SOCIAL MEDIA

CROSS-REFERENCE TO RELATED APPLICATIONS

This application claims the benefit of U.S. Provisional Patent Application No. 61/779,171 entitled "User Identification Across Social Media," filed Mar. 13, 2013, which is expressly incorporated by reference herein in its entirety.

GOVERNMENT LICENSE RIGHTS

This invention was made with government support under contract N00014-10-1-0091 awarded by the Office of Naval Research. The government has certain rights in the invention.

FIELD OF THE DISCLOSURE

This disclosure relates to methods and apparatuses for identifying users, and more particularly relates to identifying users across social media sites.

BACKGROUND

People often have multiple user accounts at different internet websites to serve their disparate needs and interests. However, because most websites maintain the anonymity of users' profile information by allowing users to freely select usernames instead of their real identities, users may provide inconsistent or false profile information, such as name, gender, age, income, marital status, etc., to associate with the username. In some situations, users may provide false information to perform illegal activity on the website.

In order to prevent illegal activity, inconsistent or false profile information provided for a user must be detected. However, identifying the inconsistencies is difficult for a number of reasons. For example, as mentioned before, most websites maintain the anonymity of user profile information. In addition, different websites rarely link their user accounts with other sites or adopt Single-Sign-On technologies, such as openID. Even further, different websites often employ different user-naming and authentication systems. Consequently, there is little or no knowledge of the connectivity among users in a single website or in different websites. That is, there is currently no way to link multiple user accounts or profiles to a single individual who created the multiple accounts.

SUMMARY

Multiple user accounts or profiles may be linked to a single individual who created the multiple accounts by identifying a mapping among identities across websites, such as social media websites, which allows individuals to be identified across the websites. For example, according to one embodiment, unique user behavioral patterns that lead to information redundancies across web sites may be identified, and features may be constructed that exploit the information redundancies due to the identified behavioral patterns. A prediction model based on a machine learning framework may then be developed and employed to analyze the features and/or behavioral patterns and perform user identification across the websites based on the features and/or behavioral patterns.

More specifically, according to one embodiment, a method for identifying users across websites may include receiving prior user information data and receiving a candidate user information datum. The method may also include identifying a first plurality of behavioral patterns in the prior user information data and a second plurality of behavioral patterns in the candidate user information datum. The method may further include determining, based at least in part on the first and second pluralities of behavioral patterns, whether the candidate user information datum and the prior user information data correspond to a user.

In another embodiment, a computer program product for identifying users across websites may include a non-transitory computer readable medium with code for performing the steps of receiving prior user information data and receiving a candidate user information datum. The medium may also include code to perform the step of identifying a first plurality of behavioral patterns in the prior user information data and a second plurality of behavioral patterns in the candidate user information datum. The medium may further include code to perform the step of determining, based at least in part on the first and second pluralities of behavioral patterns, whether the candidate user information datum and the prior user information data correspond to a user.

In yet another embodiment, an apparatus for identifying users across websites may include a memory and a processor coupled to the memory, wherein the processor is configured to execute the steps of receiving prior user information data and receiving a candidate user information datum. The processor may also be configured to execute the step of identifying a first plurality of behavioral patterns in the prior user information data and a second plurality of behavioral patterns in the candidate user information datum. The processor may further be configured to execute the step of determining, based at least in part on the first and second pluralities of behavioral patterns, whether the candidate user information datum and the prior user information data correspond to a user.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments.

DETAILED DESCRIPTION

Information shared by users on websites, such as social media websites, may provide a "social fingerprint" of the user that may be used to identify users across different websites. For example, most websites require a user to provide user information to access the contents of the website. In some embodiments, the user information may include a username to be associated with the user while the user accesses the website. According to one embodiment, usernames may be alphanumeric strings created by users or e-mail addresses of users. In another embodiment, other user information may also be analyzed across multiple websites to identify a user, such as the user's gender, location, interests, profile pictures, language, etc. When used along with usernames, this additional information may help better identify individuals. Because no two users on a website may have the same username, usernames may be reliable user information to analyze to identify an individual. In contrast, multiple users on a website may have the same personal information, such as first and last name, hence making some types of personal information non-unique and less reliable for identifying a single individual.

By identifying users across multiple websites, such as social media websites, not only can illegal activity due to false identities be detected and/or prevented, but better user profiles may be obtained that allow for improvements in online services and experiences, such as recommending friends across websites, advertising across different networks, and verifying online information. In addition, identifying users across websites may help websites identify user migration across websites, and thus adjust services to prevent further migration.

Figure 1:
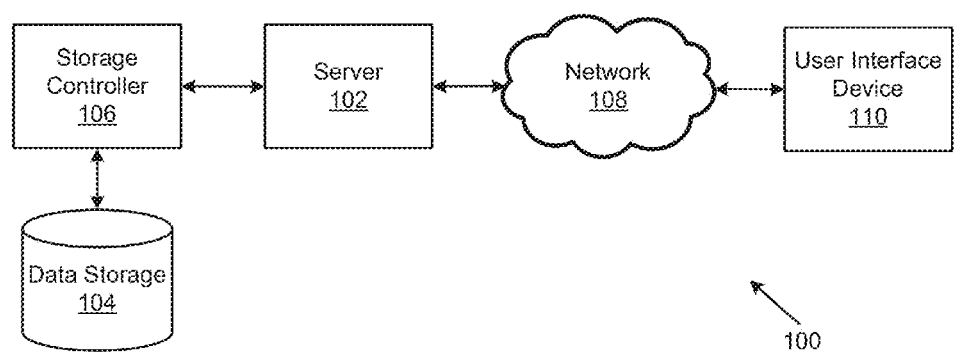
FIG. 1 is a schematic block diagram illustrating a computer network according to one embodiment of the disclosure.

FIG. 1 illustrates one embodiment of a system 100 for identifying users across websites. System 100 may include a server 102, a data storage device 104, a network 108, and a user interface device 110. In some embodiments, server 102 may include storage device 104 (a server housing or enclosure may house storage device 104). In some embodiments, system 100 may include a storage controller 106, and/or a storage server configured to manage data communications between data storage device 104 and server 102, and/or other components in communication with network 108. In some embodiments, storage controller 106 may be coupled to network 108 (e.g., such that server 102 communicates or is configured to communicate with storage controller 106 and/or storage device 104 via network 108). In a general embodiment, system 100 may be configured to store data features that capture behavioral patterns. In some embodiments, system 100 is configured to permit multiple uses and/or functions to or with the data.

In some embodiments, server 102 is configured to access data stored in data storage device(s) 104 via a Storage Area Network (SAN) connection, a Local Area Network (LAN), a data bus, or the like. Data storage device 104 may include a hard disk, including hard disks arranged in an Redundant Array of Independent Disks (RAID) array, a tape storage drive comprising a magnetic tape data storage device, an optical storage device, or the like. In one embodiment, data storage device 104 stores a data feature set, as described in more detail below. In some embodiments, server 102 and/or storage device(s) 104 are configured to create a back-up (full and/or partial back-up) of the data of system 100, such as, for example, periodically and/or responsive to an instruction from a system administrator to back-up data on the system.

In some embodiments, user-interface device 110 is referred to broadly and comprises a suitable processor-based device such as, for example, a desktop computer, a laptop computer, a Personal Digital Assistant (PDA), and/or a mobile communication or organizer device (e.g., a cellular phone, smartphone, etc.) having access to the network 108. In some embodiments, user interface device 110 can be configured to access the Internet to access a web application or web service hosted by server 102 and thereby provide a user interface for enabling a user to enter or receive information (e.g., from server 102). For example, in some embodiments, user interface device 110 can be configured to: receive data from a user (e.g., via user-input device, such as a keyboard, mouse, touchscreen, and/or the like); prompt a user for input (e.g., server 102 can be configured to instruct user-interface device 110 to prompt a user for input); and/or transmit to server 102 (e.g., via network 108) user input provided through the user-input device.

Network 108 may facilitate communications of data between server 102 and user interface device 110. Network 108 may include any type of communications network including, but not limited to, a direct PC to PC connection, a LAN, a wide area network (WAN), a modem to modem connection, the Internet, a combination of the above, or any other communications network now known or later developed within the networking arts which permits two or more computers to communicate, one with another.

Figure 2:
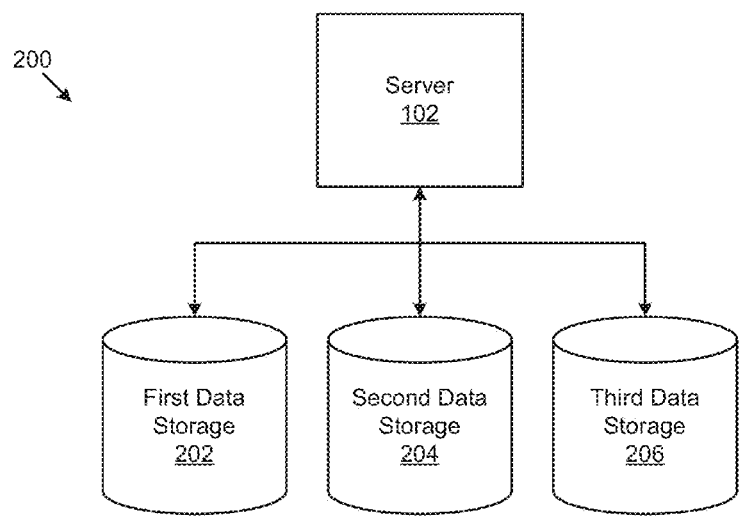
FIG. 2 is a schematic block diagram illustrating system according to one embodiment of the disclosure.

FIG. 2 illustrates one embodiment of a data management system 200 configured to store and manage data for identifying users across websites. In one embodiment, the system 200 may include a server 102. The server 102 may be coupled to a data bus that may, for example, communicate with one or more data storage devices. In one embodiment, the system 200 may also include a first data storage device 202, a second data storage device 204, and/or a third data storage device 206. In further embodiments, the system 200 may include additional data storage devices (not shown). In such an embodiment, each data storage device 202-206 may host a separate database. In some embodiments, storage devices 202-206 may be arranged in a RAID configuration for storing redundant copies of a database or databases (e.g., through synchronous or asynchronous redundancy updates).

In various embodiments, server 102 may communicate with data storage devices 204-210 over a data bus (illustrated by arrows between server 102 and storage devices 202-206). In such embodiments, the data bus may comprise a SAN, a LAN, or the like. The communication infrastructure may include Ethernet, Fibre-Channel Arbitrated Loop (FC-AL), Small Computer System Interface (SCSI), and/or other similar data communication schemes associated with data storage and communication. For example, server 102 may communicate indirectly with data storage devices 202-206 (e.g., via a storage server or storage controller 106).

Server 102 may host one or more software applications (e.g., web- and/or Internet-accessible software applications) configured for (e.g., network-based) access to and/or modification of the data and/or executables (e.g., for implementing the methods) described in this disclosure. The software application may further include modules configured to interface with data storage devices 202-206, network 108, a user (e.g., via a user-interface device 110), and/or the like. In a further embodiment, server 102 may host an engine, application plug-in, or application programming interface (API). In another embodiment, server 102 may host a web service and/or other web accessible software application.

Figure 3:
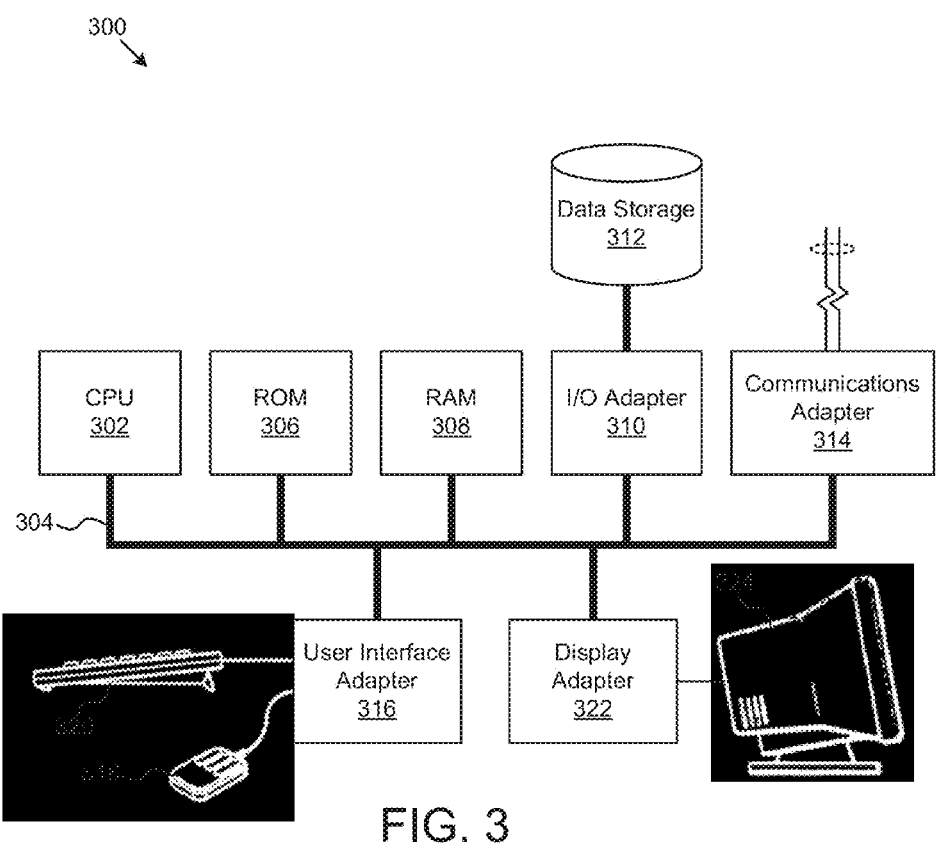
FIG. 3 is a schematic block diagram illustrating a computer system according to one embodiment of the disclosure.

FIG. 3 illustrates a computer system 300 adapted according to certain embodiments of server 102 and/or user interface device 110. Central processing unit (CPU) 302 is coupled to system bus 304. CPU 302 may be a general purpose CPU or microprocessor. The present embodiments are not restricted by the architecture of CPU 302, as long as CPU 302 supports the modules, configurations, and/or operations as described herein. CPU 302 may execute the various logical instructions of the present embodiments. For example, CPU 302 may execute machine-level instructions according to the exemplary operations described below.

Computer system 300 also may include Random Access Memory (RAM) 308, which may be SRAM, DRAM, SDRAM, or the like. Computer system 300 may utilize RAM 308 to store the various data structures used by a software application configured for identifying users across websites. Computer system 300 may also include Read Only Memory (ROM) 306 which may be PROM, EPROM, EEPROM, optical storage, or the like. ROM 306 may store configuration information for booting computer system 300. RAM 308 and ROM 306 may also store user and/or system data.

Computer system 300 may also include an input/output (I/O) adapter 310, a communications adapter 314, a user interface adapter 316, and a display adapter 322. I/O adapter 310, communications adapter 314, and/or user interface adapter 316 may, in some embodiments, enable a user to interact with computer system 300. In a further embodiment, display adapter 322 may display a graphical user interface associated with a software or web-based application for accessing the system and/or implementing the methods described in this disclosure.

I/O adapter 310 may connect one or more storage devices 312, such as one or more of a hard drive, a Compact Disk (CD) drive, a floppy disk drive, and a tape drive, to the computer system 300. Communications adapter 314 may be adapted to couple computer system 300 to network 108, which may, for example, be one or more of a LAN, WAN, and/or the Internet. User interface adapter 316 couples user input devices, such as a keyboard 320 and a pointing device 318, to computer system 300. Display adapter 322 may be driven by CPU 302 to control the display on display device 324.

The present embodiments are not limited to the architecture of system 300. Rather, computer system 300 is provided as an example of one type of computing device that may be configured to perform the functions of a server 102 and/or user interface device 110. For example, any suitable processor-based device may be utilized including without limitation, PDAs, computer game consoles, smart phones, and multi-processor servers. Moreover, the present embodiments may be implemented on application specific integrated circuits (ASIC) or very large scale integrated (VLSI) circuits. In fact, persons of ordinary skill in the art may utilize any number of suitable structures capable of executing logical operations according to the described embodiments.

Figure 4:
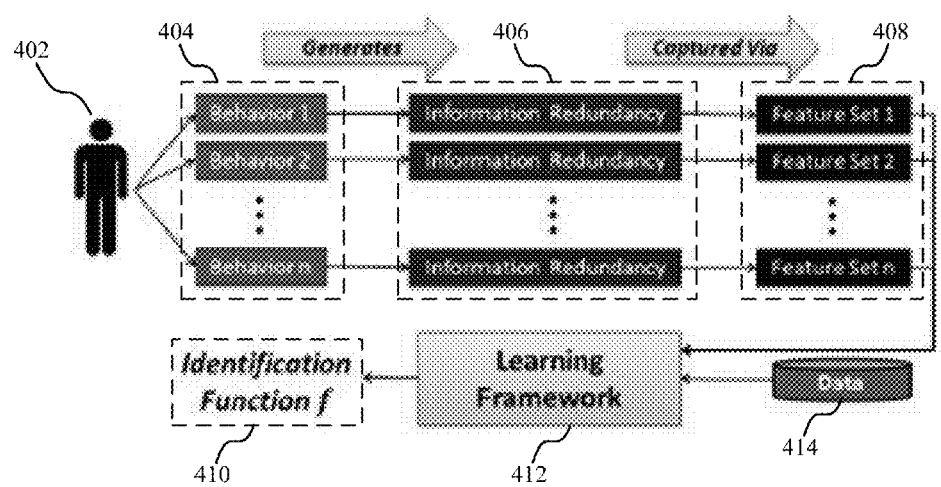
FIG. 4 is a flow chart illustrating an overview of a method for identifying users across websites according to one embodiment of the disclosure.

FIG. 4 is a flow chart illustrating an overview of a method for identifying users across websites based on user information, such as a username, according to one embodiment of the disclosure. A user 402 at websites 1, 2, . . . , m 422A-422M may create a username or provide user information, which may be the same or different, for each of the m websites. In creating the usernames, the user 402 may exhibit certain behavioral patterns 404, which may result in information redundancy 406. For example, between the usernames "JOEBOB1" and "JOEB01," the user has a behavior pattern to use a first name and a portion of a last name, and a similar numeral value.

Redundant information may be determined based on the behavioral patterns. Information redundancy 406 exists in the user-supplied data where the behaviors 404 overlap. According to one embodiment, the information redundancy 406 may be captured computationally in terms of data features 408. For example, a plurality of data features may be constructed, wherein each data feature of the plurality of data features corresponds to a redundant information datum of the redundant information determined based on the behavioral patterns.

An identification function 410 to identify users across web sites, such as social media websites, may be learned by employing a supervised learning framework 412 that utilizes the data features 408 and prior user information 414, such as prior usernames with known owners. For example, a prediction model based on the constructed plurality of data features may be generated to determine whether candidate user information datum, such as a candidate username, and the prior user information data, such as prior usernames, correspond to the same user, where candidate usernames may be usernames for which the owner is not known. Therefore, in some embodiments, the identification function may seek to identify the ownership of a candidate username. In some embodiments, learning may be performed via either classification or regression. As a result of the supervised learning framework 412, when given a set of prior usernames $U=\{u_1, u_2, \ldots, u_n\}$ owned by individual I and a candidate username c, the user identification function 410 may be defined as:

$$f(U, c) = \begin{cases} 1 & \text{If } c \text{ and set } U \text{ belong to } I; \\ 0 & \text{Otherwise.} \end{cases}$$

In the example above, another username, such as "JOEB-BOB1" may be determined to also belong to the same user based on a similar use of the first name, the last name, and the numeral value.

Depending on the learning framework 412, the probability that an individual owns the candidate username may also be learned, thereby generalizing the binary function $f(U, c)$ to a probabilistic model ($f(U,c)=p$). In some embodiments, the probabilistic model may be used to identify an individual that is most likely to own the candidate username, or generate an ownership ranking for individuals.

Figure 5:
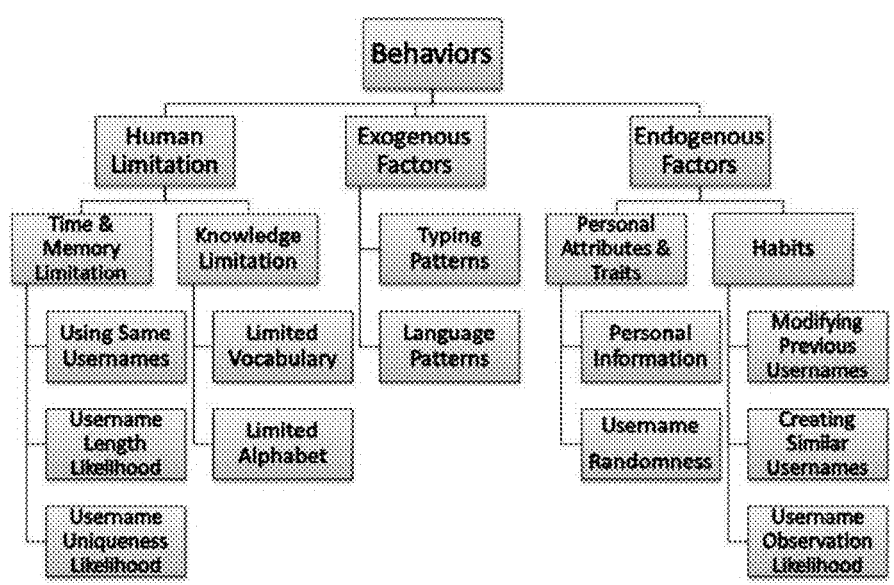
FIG. 5 is a schematic block diagram illustrating a plurality of behavioral patterns exhibited by users when creating usernames according to one embodiment of the disclosure.

FIG. 5 is a schematic block diagram illustrating a plurality of behavioral patterns exhibited by users when creating usernames according to one embodiment of the disclosure. In some embodiments, individuals may exhibit consistent behavioral patterns while selecting their usernames. The patterns may result in information redundancies that may be captured as data features that can be used to identify individuals across websites. Examples, and not limitations, of features, some of which will be described in more detail below, that can be used to identify individuals across websites include: standard deviation of normalized edit distance between a candidate username and prior usernames, standard deviation of normalized longest common substring between the username and prior usernames, username observation likelihood, uniqueness of prior usernames, exact match (number of times candidate username is seen among prior usernames), Jaccard similarity between the alphabet distribution of the candidate username and prior usernames, standard deviation of the distance traveled when typing prior usernames using a QWERTY keyboard, distance traveled when typing a candidate username using a QWERTY keyboard, standard deviation of the longest common substring between the username and prior usernames, and/or median of the longest common subsequence between the candidate username and prior usernames.

In some embodiments, behavioral patterns may be categorized into three primary categories: human limitations, exogenous factors, and endogenous factors. In addition, the features designed to capture information generated by these patterns may be divided into three categories: candidate username features, prior username features, and candidate username-prior username features. A candidate username feature may be extracted directly from a candidate username. A prior username feature may describe the set of prior usernames of an individual. A candidate username-prior username feature may describe the relationship between a candidate username and prior usernames.

With respect to human limitations, humans, in general, have 1) limited time and memory and 2) limited knowledge. Both create biases that can affect username selection behavior. For example, as a result of limited time and memory, a majority of individuals prefer to use the same username(s) repeatedly, for ease of remembering. Therefore, when a candidate username c is among prior usernames U, that may be a strong indication that the candidate username c is owned by the same individual who also owns the prior usernames. As a result, the number of times candidate username c is repeated in prior usernames may be considered a feature in some embodiments.

Similarly, users may have a limited set of potential usernames from which to select when asked to create a new username. The limited set of potential usernames may have different lengths and, as a result, a length distribution L. For example, if an individual is inclined to select usernames of length 8 or 9, it may be unlikely for the individual to consider creating usernames with lengths longer or shorter than that. In addition, users often prefer not to create new usernames. Therefore, the length of the candidate username and the length distribution for prior usernames may be considered as features in some embodiments.

Because users often prefer not to create new usernames, a measure of the effort users are willing to put into creating new usernames may help identify users in some embodiments. According to one embodiment, the effort may be approximated by the number of unique usernames (uniq(U)) in the set of prior usernames U for an individual, which may be quantified as:

$$\text{uniqueness} = \frac{|uniq(U)|}{|U|}.$$

In some embodiments, uniqueness may be a feature in the feature set used to train the identification function. According to one embodiment, the inverse ration (1/uniqueness) may be provide an indication of an individual's username capacity, e.g., the average number of times an individual employs a username on different websites before deciding to create a new username.

With respect to human limitations related to knowledge, an individual's vocabulary is limited in any language. For example, it is highly likely for native speakers of a language to know more words in that language than individuals speaking it as a second language. Therefore, an individual's vocabulary size in a language may be a feature for identifying them, and as a result, the number of dictionary words that are substrings of the username may be used as a feature in some embodiments.

Similarly, the alphabet letters used in a username are highly dependent on language. For instance, while the letter 'x' is common when a Chinese speaker selects a username, it is rarely used by an Arabic speaker, because no Arabic word transliterated in English contains the letter 'x.' Therefore, the number of alphabet letters used in a username may be considered a feature, both for a candidate username as well as prior usernames.

Exogenous factors may be considered behaviors observed due to cultural affects or the environment in which the a user lives. For example, typing patterns may be considered a general constraint imposed by the environment because most people use one of two well-known keyboards, DVORAK and QWERTY (or slight variants, such as QWERTZ or AZERTY), and the layout of the keyboard has been shown to significantly impact how random usernames are selected by users. For example, "qwer1234" and "aoeusnth" are two well-known passwords commonly selected by QWERTY and DVORAK users, respectively. Thus, typing patterns may be considered features in some embodiments. According to one embodiment, keyboard-related typing patterns captured with typing pattern features may include the percentage of keys typed using the same hand used for the previous key, the percentage of keys typed using the same finger used for the previous key, the percentage of keys typed using each finger, the percentage of keys pressed on rows, the approximate distance traveled for typing a username, and the like.

In addition to environmental factors, cultural priors, such as language patterns, are other exogenous factors that affect the username selection process. For example, users often use the same language or the same set of languages when selecting usernames. Therefore, when detecting languages of different usernames belonging to the same individual, fairly consistent results may be expected. Accordingly, the language of the username may be used as a feature in some embodiments. In one embodiment, an n-gram statistical language detector may be trained over numerous languages to detect the language in a username. A trained model may then detect the candidate username language, which may be a feature in the feature set. The language detector may also be used on prior usernames to determine a language distribution for prior usernames.

In addition to human limitations and exogenous factors, endogenous factors also influence username selection. Endogenous factors result from 1) personal attributes, such as name, age, sex, roles and positions, and the like, and 2) characteristics, e.g., a female selecting username "fungirl09," a father selecting "geekdad," or a PlayStation 3 fan selecting "PS3lover2009." Other endogenous factors result from 3) habits, such as abbreviating usernames or adding prefixes/suffixes.

With respect to personal attributes, in some embodiments, when personal information, several languages, specific names, locations, or words that are of specific interest to the individual selecting the username are used, the patterns may be captured by analyzing the alphabet distribution. For instance, a user selecting username Kalambo most of the time will create an alphabet distribution where letter a is repeated twice more than other letters. Thus, in one embodiment, the alphabet distribution of both candidate username and prior usernames may be defined feature sets for identifying users. Alphabet distribution may improve the ease with which patterns like an excessive use of the letter i in languages such as Arabic or Tajik may be captured. Another benefit of using alphabet distribution may be that in addition to being language-independent, alphabet distribution can also capture words that are meaningful only to the user.

The randomness of usernames selected by an individual may be another type of pattern that can be influenced by personal attributes. For example, individuals who select totally random usernames generate no information redundancy. Therefore, in some embodiments, the randomness of the usernames of an individual may be identified as a feature set that can describe some individuals and help identify them. For measuring randomness, the entropy of the candidate username's alphabet distribution and the entropy of the prior usernames' alphabet distribution may be used as features.

As a result of other endogenous factors, such as habits, individuals tend to modify previous usernames or create similar usernames when creating new usernames. For example, individuals may modify their previous usernames to create new usernames by adding prefixes or suffixes, abbreviating a previous username, swapping characters, and/or adding characters between characters of a previous username. The modifications to previous usernames to create new usernames may be captured a number of ways. For example, to detect added prefixes or suffixes, the identification function can check if one username is the substring of the another username. Therefore, the length of the Longest Common Sub-string (LCS) may be used in some embodiments as an informative feature about how similar a username is to prior usernames. The computation of the LCS of all prior usernames to a candidate username may generate a distribution of LCS length values. This can be used as a set of features to quantify distribution of LCS length values the similarity between the candidate username and all prior usernames. The computation of the LCS of all prior usernames may be normalized to get values in a range between zero and one.

For detecting abbreviations to a previous username, a Longest Common Subsequence length may be used as a feature because it can detect nonconsecutive letters that match in two strings. The pairwise computation of the Longest Common Subsequence of all prior usernames to a candidate username may generate a distribution of Longest Common Subsequence length values. This distribution of Longest Common Subsequence length between the candidate username and for all prior usernames may be used as a set of features to quantify the similarity between the candidate username and all prior usernames. As with the LCS, a normalized version of the distribution of Longest Common Subsequence length values may be stored as another distribution feature.

Figure 6:
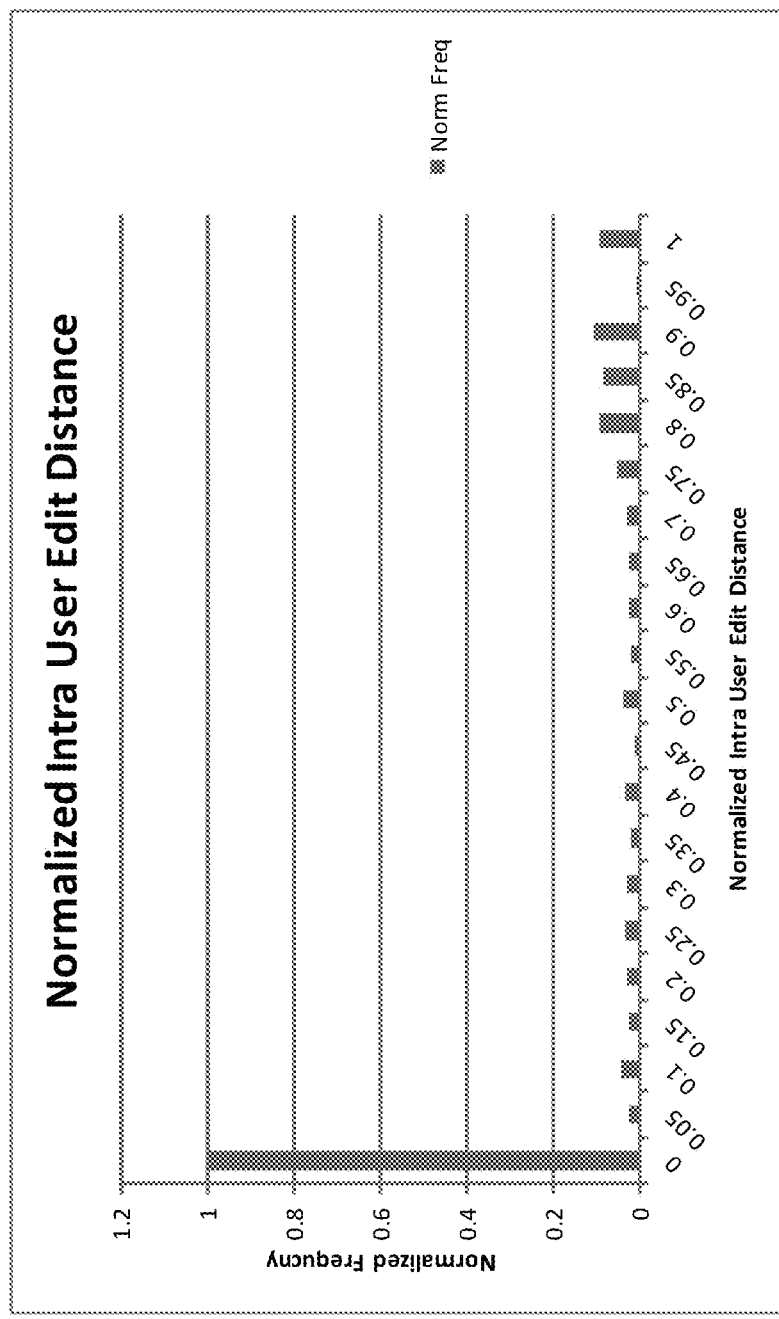
FIG. 6 is an illustration showing the normalized edit distance between usernames of a same individual according to one embodiment of the disclosure.

For detecting swapped letters and letters added between characters of a previous username, the identification function may use the normalized and unnormalized versions of both the Edit Distance (also known as the Levenshtein distance) and the Dynamic Time Warping (DTW) distance as measures. As before, the end results may be distributions that can be saved as features. For example, FIG. 6 is an illustration showing the normalized edit distance between usernames of the same individual according to one embodiment of the disclosure. The horizontal axis shows the normalized edit distance value. The vertical axis is the normalization of the frequency of the number of pair of usernames of the same individual that had that distance.

Figure 7:
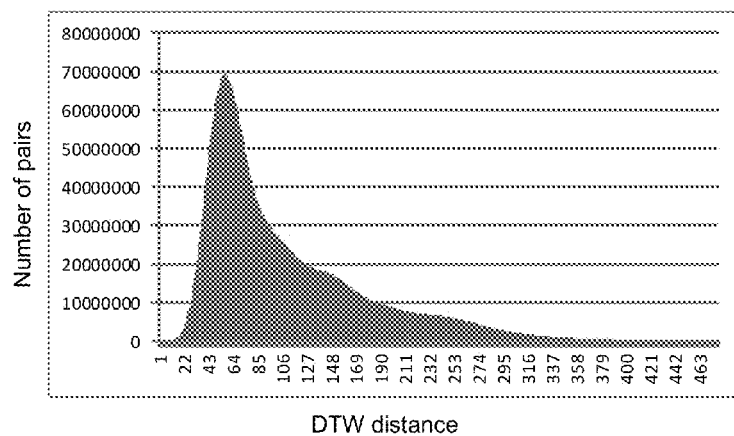
FIG. 7 is an illustration showing the Dynamic Time Warping (DTW) distance between usernames of different individuals according to one embodiment of the disclosure.

FIG. 7 is an illustration showing the DTW distance between usernames of different individuals according to one embodiment of the disclosure. The horizontal axis shows DTW distance and the vertical axis shows the number of pairs found in a dataset that had that DTW distance. The histogram in FIG. 7 demonstrates the distribution of DTW distances when usernames belong to different individuals.

Figure 8:
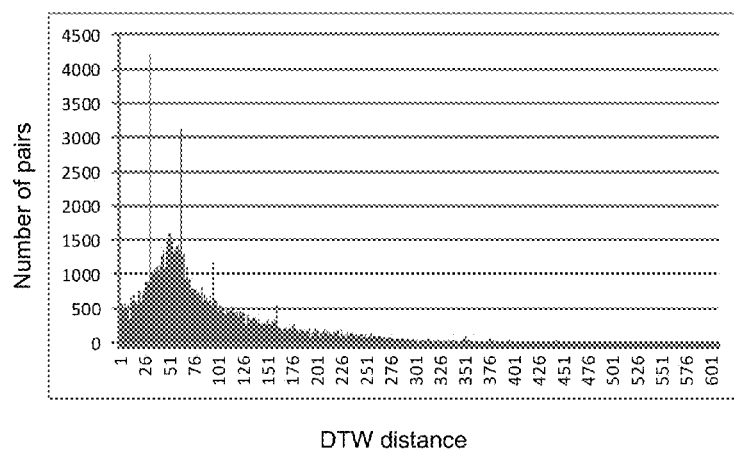
FIG. 8 is an illustration showing the Dynamic Time Warping (DTW) distance between usernames of the same individual according to one embodiment of the disclosure.

FIG. 8 is an illustration showing the DTW distance between usernames of the same individual according to one embodiment of the disclosure. The horizontal axis shows DTW distance and the vertical axis shows the number of pairs found in a dataset that had that DTW distance. This histogram of FIG. 8 demonstrates the distribution of DTW distances when usernames belong to the same individual.

In addition to modifying previous usernames, users tend to generate similar usernames. In some embodiments, the similarity between usernames may be difficult to capture using approaches discussed for detecting username modifications of previous usernames. For example, gateman and nametag are highly similar due to one being the other spelled backward, but their similarity may not be recognized. Therefore, in some embodiments, different similarity measures may use the alphabet distribution for both the candidate username and prior usernames to compare the similarities between the candidate username and prior usernames. Examples, and not limitations, of similarity measures include the Kullback-Liebler divergence (KL), the Jensen-Shannon divergence (JS), and the cosine similarity. Because the JS divergence does not measure the overlap between alphabets, a Jaccard Distance may be computed and stored as a feature to compute the alphabet overlaps.

In some embodiments, as a result of habits, the order in which users juxtapose letters to create usernames may depend on the user's prior knowledge. According to one embodiment, this factor may be captured by determining a username observation likelihood. That is, given knowledge of prior usernames, the probability of observing a candidate username may be estimated. In one embodiment, prior knowledge may be gleaned based on how letters come after one another in prior usernames, and the probability of observing a candidate username may be approximated with an n-gram model. To estimate the observation probability of a candidate username using an n-gram model, the probability of observing its comprising n-grams may be computed first based on knowledge of prior usernames. Because some n-grams may not be observed in prior usernames, a smoothing technique, such as a Modified Kneser-Ney (MKN) smoothing technique, may be used. For example, the MKN smoothing technique may determine discount parameters for n-grams observed once, twice, or more times, and the discounted values may be distributed among unobserved n-grams for use when computing the probability of observing a candidate username's comprising n-grams. Therefore, in order to account for username observation likelihood, the candidate username observation probability, estimated by an MKN-smoothed 6-gram model, may be computed and stored as a feature for user identification.

In some embodiments, some behaviors and/or characters may help identify individuals more easily. For example, according to one embodiment, numbers may help better identify individuals than alphabet letters, thereby giving numbers a higher ranking or weight in the identification function than alphabet letters. Additionally, in one embodiment, non-English alphabet letters or special characters, such as '+,' '&,' or '$,' may also make identifying individuals across websites easier.

Figure 9:
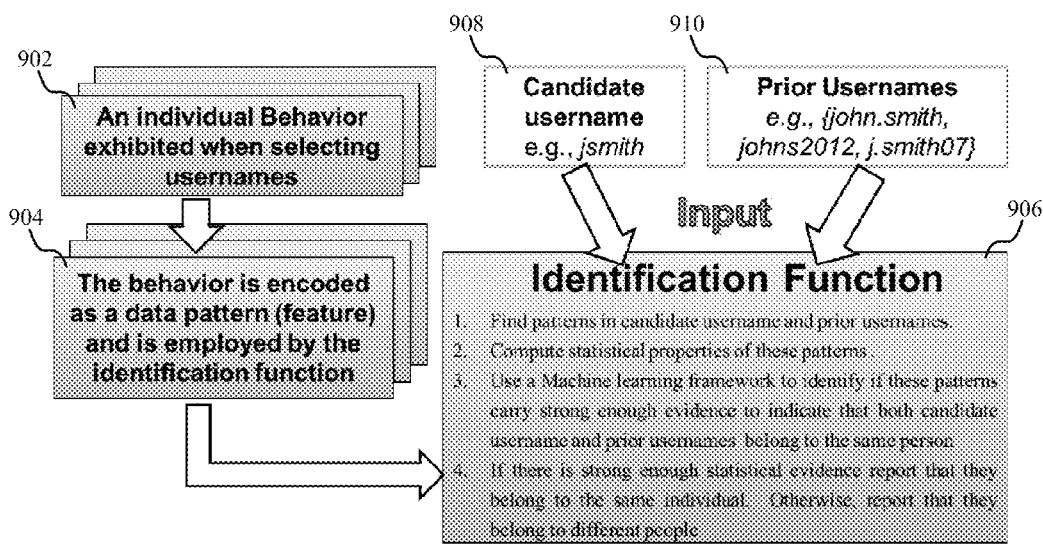
FIG. 9 is a flow chart illustrating the use of an identification function in a method for identifying users across websites according to one embodiment of the disclosure.

FIG. 9 is a flow chart illustrating the use of an identification function in a method for identifying users across websites according to one embodiment of the disclosure. As shown at blocks 902, individuals exhibit behavioral patterns, such as the behavioral patterns discussed with reference to FIG. 5, when selecting usernames. Prior usernames with known owners may be analyzed to identify username selection behavioral patterns, and/or train a training function, that can be captured as features to be employed by the identification function. In some embodiments, prior usernames may be gathered by conducting surveys of users on social networks and asking the users to provide their usernames across social networks.

According to another embodiment, prior usernames may be gathered by manually finding users on multiple websites. For example, users often provide personal information, such as their real names, e-mail addresses, location, sex, profile photos, and age on websites. By manually searching the information provided on multiple websites, users on the multiple websites may be mapped to the same individual.

In some embodiments, prior usernames may be gathered from websites that allow users to provide their user information, such as usernames, on different websites. For example, various social networking websites, blogging and blog advertisement/cataloging websites, and online forums allow users to provide their user information on different websites. Therefore, such websites may be used to collect usernames that are guaranteed to belong to the same individual.

According to one embodiment, a positive instance may refer to a pair comprising a username and a set of usernames where both the username and set of usernames are known to belong to the same individual. A negative instance may refer to a pair comprising a username and set of usernames where both the username and set of usernames are known to belong to different individuals. Therefore, the prior username gathering schemes discussed above may be useful in obtaining positive instances. In some embodiments, a combination of positive and negative instances may be used to learn an identification function. To obtain negative instances, pairs may be randomly generated such that the prior username in the randomly generated pair is from one positive instance and the set of usernames in the randomly generated pair is from a different positive instance.

As shown in FIG. 9 at blocks 904, the behaviors exhibited by individuals when selecting usernames may be encoded as data patterns/features that can be employed by the identification function to identify users. Because the prior user information may be used to calculate features as shown with reference to FIG. 5, the identification function may be learned by performing supervised learning on the data feature set using a supervised learning algorithm. According to one embodiment, learning algorithms include, but are not limited to, $l_1$-Regularized Logistic Regression, $l_2$-Regularized Logistic Regression, $l_1$-Regularized $l_2$-Loss SVM, $l_2$-Regularized $l_2$-Loss SVM, J48 Decision Tree Learning, Naïve Bayes, and Random Forest. As noted previously, a probabilistic classifier can generalize the binary identification function to a probabilistic one where the probability of a candidate username belonging to an individual may be measured. In some embodiments, probabilistic classification may be achieved via a variety of Bayesian approaches, such as Naive Bayes.

As shown at block 906, the identification function may employ the data features to identify users across websites. For example, the identification function may receive candidate user information datum, such as a candidate username 908, and prior user information, such as prior usernames 910. According to one embodiment, candidate usernames may be obtained from the internet via search engines. In some embodiments, candidate usernames may be obtained from the same web pages that include at least one prior username, from uniform resource locators (URLs) of websites, and/or from profile pages of internet users.

After receiving the candidate user information datum and the prior user information, the identification function may identify a first plurality of behavioral patterns in the prior user information data and a second plurality of behavioral patterns in the candidate user information datum. In some embodiments, statistical properties of the prior user information data and the candidate user information datum may be computed based on the first and second pluralities of behavioral patterns. The user identification function may determine whether the candidate user information datum and the prior user information data correspond to a user based, at least in part, on the first and second pluralities of behavioral patterns and/or the statistical properties. For example, a system for identifying users across websites may use a machine learning framework to identify if the patterns carry strong enough evidence to indicate that both the candidate username and prior usernames belong to the same person. If there is sufficient statistical evidence, the system may report that the candidate username and the prior usernames belong to the same individual. Otherwise, the system may report that the candidate username and the prior usernames belong to different individuals.

Figure 10:
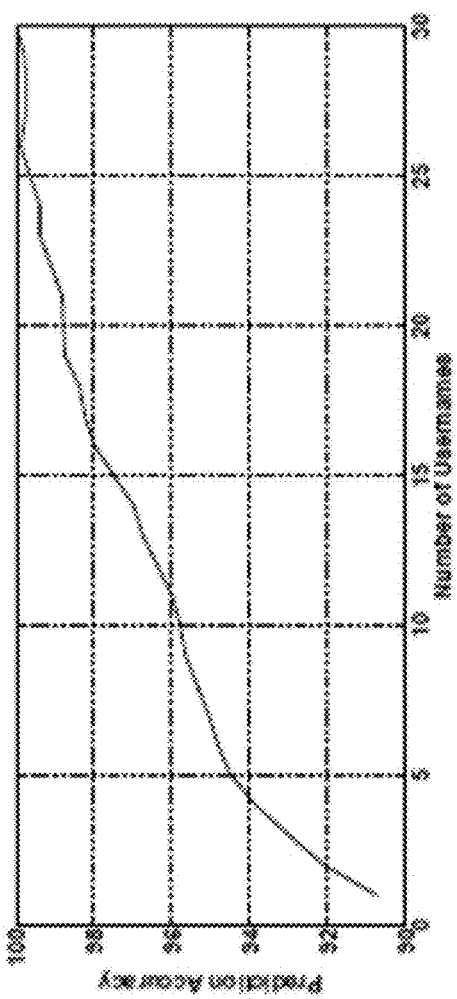
FIG. 10 is an illustration showing how adding prior usernames improves prediction accuracy according to one embodiment of the disclosure.

FIG. 10 is an illustration showing how adding prior usernames improves prediction accuracy according to one embodiment of the disclosure. As shown in FIG. 10, in some embodiments, there exists a monotonically increasing trend in identification performance, i.e., prediction accuracy, as prior usernames are added to the system.

Figure 11:
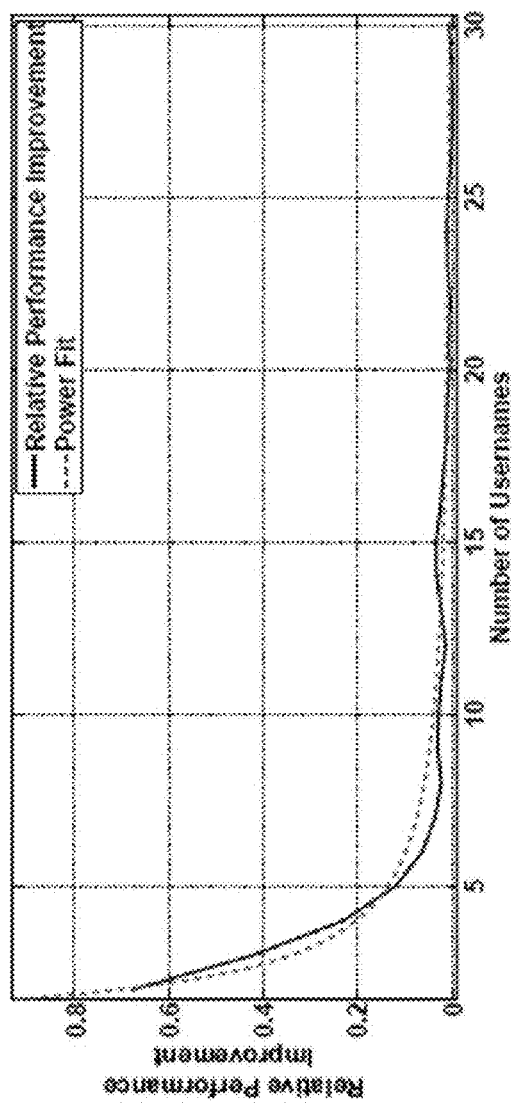
FIG. 11 is an illustration showing a user identification relative improvement result of adding usernames to one embodiment for identifying users across websites according to one embodiment of the disclosure.

FIG. 11 is an illustration showing a user identification relative improvement result of adding usernames to one embodiment for identifying users across websites according to one embodiment of the disclosure. As shown in FIG. 11, in some embodiments, there exists a diminishing return property, where the improvement in performance may become marginal as usernames are added.

Figure 12:
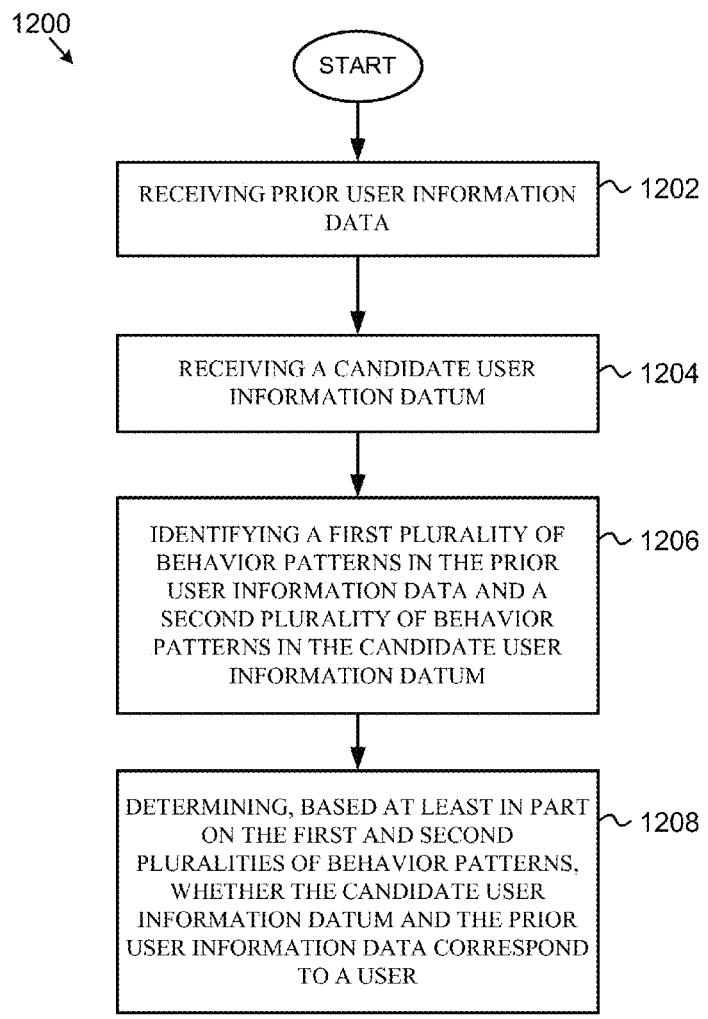
FIG. 12 is a flow chart diagram illustrating a method for identifying users across websites according to one embodiment of the disclosure.

FIG. 12 is a flow chart diagram illustrating a method for identifying users across websites according to one embodiment of the disclosure. Embodiments of method 1200 may be implemented with the systems described above with respect to FIGS. 1-3. For example, embodiments of method 1200 may be implemented by system 100. In general, embodiments of method 1200 may be implemented by other similar systems without deviating from this disclosure so long as the systems, whether directly or indirectly, support the operations described.

Specifically, method 1200 includes, at block 1202, receiving prior user information data, and, at block 1204, receiving a candidate user information datum. In some embodiments, the prior user information data may include user information data on a plurality of websites. According to one embodiment, the user information may include a username.

At block 1206, method 1200 includes identifying at least a first behavioral pattern of a first plurality of behavioral patterns in the prior user information data and at least a second behavioral pattern of a second plurality of behavioral patterns in the candidate user information datum. For example, the first plurality of behavioral patterns may be identified based on the user information data on the plurality of websites. According to one embodiment, the plurality of websites may include at least one social media website. In some embodiments, the identified behavioral patterns may include patterns based on at least one of human limitations, exogenous factors, and endogenous factors, as discussed with reference to FIG. 5.

In some embodiments, redundant information data based on the first plurality of behavioral patterns may be determined and a plurality of data features may be constructed based on the redundant information, wherein each data feature of the plurality of data features corresponds to a redundant information datum of the redundant information data. According to one embodiment, statistical properties of the prior user information data and the candidate user information datum may also be computed based on the first and second pluralities of behavioral patterns.

At block 1208, method 1200 includes determining, based at least in part on the first and second pluralities of behavioral patterns, whether the candidate user information datum and the prior user information data correspond to a user. For example, in one embodiment, a prediction model based on the constructed plurality of data features may be generated, and determining whether the candidate user information datum and the prior user information data correspond to the same user may be based on prediction model. In another embodiment, determining whether the candidate user information datum and the prior user information data correspond to the same user may also be based on the computed statistical properties.

While, for purposes of simplicity of explanation, methodologies are shown and described as a series of acts/blocks, it will be understood and appreciated that the claimed subject matter is not limited by the number or order of blocks, as some blocks may occur in different orders and/or at substantially the same time with other blocks from what is depicted and described. Moreover, not all illustrated blocks may be required to implement all of the described methodologies. It will also be appreciated that the functionality associated with the blocks may be implemented by the disclosed systems.

In some embodiments, the techniques or steps of the disclosed methods may be embodied directly in hardware, in software stored on non-transitory media and executable by a processor, or in a combination of the two. For example, a software module may reside in RAM memory, flash memory, ROM memory, EPROM memory, EEPROM memory, registers, hard disk, a removable disk, a CD-ROM, or any other form of non-transitory storage medium known in the art. An exemplary non-transitory storage medium may be coupled to the processor such that the processor can read data from, and write data to, the storage medium. In the alternative, the non-transitory storage medium may be integral to the processor. The processor and the storage medium may reside in an ASIC. The ASIC may reside in a user device. In the alternative, the processor and the non-transitory storage medium may reside as discrete components in a user device.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
receiving prior user information data comprising a plurality of usernames corresponding to a known user;
receiving a candidate user information datum comprising a username corresponding to an unknown user;
identifying a first behavioral pattern in the prior user information data based on content in the plurality of usernames, wherein the first behavioral pattern identifies the known user based on the content in the plurality of usernames, and a second behavioral pattern based on a content in the username in the candidate user information datum, wherein the second behavioral pattern is based on the content in the username and is indicative of the unknown user,
wherein the step of identifying a first behavioral pattern in the prior user information data based on content in the plurality of usernames comprises the step of determining a distribution of dynamic time warping (DTW) distances for the plurality of usernames, and wherein the step of determining whether the candidate user information datum and the prior user information data correspond to the same user comprises determining whether a distribution of DTW distances indicates that the candidate user information datum belongs to the known user; and
determining, based at least in part on the first and second behavioral patterns, whether the candidate user information datum and the prior user information data correspond to a user such that the known user and the unknown user are the same user.

2. The method of claim 1, wherein the first behavioral pattern is one of a first plurality of behavioral patterns, and wherein the second behavioral pattern is one of a second plurality of behavioral patterns.

3. The method of claim 2, further comprising:
determining redundant information data based on the first plurality of behavioral patterns;
constructing a plurality of data features, wherein each data feature of the plurality of data features corresponds to a redundant information datum of the redundant information data; and
generating a prediction model based on the constructed plurality of data features, wherein determining whether the candidate user information datum and the prior user information data correspond to the same user is further based on the prediction model.

4. The method of claim 2, further comprising computing statistical properties of the prior user information data and the candidate user information datum based on the first and second pluralities of behavioral patterns, wherein determining whether the candidate user information datum and the prior user information data correspond to the same user is further based on the statistical properties.

5. The method of claim 2, wherein the prior user information data comprises user information data on a plurality of websites, and the first plurality of behavioral patterns are identified based on the user information data on the plurality of websites.

6. The method of claim 2, wherein the first and second pluralities of behavioral patterns comprise patterns based on at least one of: human limitation, exogenous factors, and endogenous factors.

7. A computer program product, comprising:
a non-transitory computer readable medium comprising code for performing the steps of:
receiving prior user information data comprising a plurality of usernames corresponding to a known user;
receiving a candidate user information datum comprising a username corresponding to an unknown user;
identifying a first behavioral pattern in the prior user information data based on content in the plurality of usernames, wherein the first behavioral pattern identifies the known user based on the content in the plurality of usernames, and a second behavioral pattern based on a content in the username in the candidate user information datum, wherein the second behavioral pattern is based on the content in the username and is indicative of the unknown user,
wherein the step of identifying a first behavioral pattern in the prior user information data based on content in the plurality of usernames comprises the step of determining a distribution of dynamic time warping (DTW) distances for the plurality of usernames, and wherein the step of determining whether the candidate user information datum and the prior user information data correspond to the same user comprises determining whether a distribution of DTW distances indicates that the candidate user information datum belongs to the known user; and
determining, based at least in part on the first and second behavioral patterns, whether the candidate user information datum and the prior user information data correspond to a user such that the known user and the unknown user are the same user.

8. The computer program product of claim 7, wherein the first behavioral pattern is one of a first plurality of behavioral patterns, and wherein the second behavioral pattern is one of a second plurality of behavioral patterns.

9. The computer program product of claim 8, wherein the medium further comprises code for performing the steps of:
determining redundant information data based on the first plurality of behavioral patterns;
constructing a plurality of data features, wherein each data feature of the plurality of data features corresponds to a redundant information datum of the redundant information data; and
generating a prediction model based on the constructed plurality of data features, wherein determining whether the candidate user information datum and the prior user information data correspond to the same user is further based on the prediction model.

10. The computer program product of claim 8, wherein the medium further comprises code for performing the step of computing statistical properties of the prior user information data and the candidate user information datum based on the first and second pluralities of behavioral patterns, wherein determining whether the candidate user information datum and the prior user information data correspond to the same user is further based on the statistical properties.

11. The computer program product of claim 8, wherein the prior user information data comprises user information data on a plurality of websites, and the first plurality of behavioral patterns are identified based on the user information data on the plurality of websites.

12. The computer program product of claim 8, wherein the first and second pluralities of behavioral patterns comprise patterns based on at least one of: human limitation, exogenous factors, and endogenous factors.

13. An apparatus, comprising:
a memory; and a processor coupled to the memory, wherein the processor is configured to execute the steps of:

receiving prior user information data comprising a plurality of usernames corresponding to a known user;

receiving a candidate user information datum comprising a username corresponding to an unknown user;

identifying a first behavioral pattern in the prior user information data based on content in the plurality of usernames, wherein the first behavioral pattern identifies the known user based on the content in the plurality of usernames, and a second behavioral pattern based on a content in the username in the candidate user information datum, wherein the second behavioral pattern is based on the content in the username and is indicative of the unknown user, wherein the step of identifying a first behavioral pattern in the prior user information data based on content in the plurality of usernames comprises the step of determining a distribution of dynamic time warping (DTW) distances for the plurality of usernames, and wherein the step of determining whether the candidate user information datum and the prior user information data correspond to the same user comprises determining whether a distribution of DTW distances indicates that the candidate user information datum belongs to the known user; and determining, based at least in part on the first and second behavioral pattern, whether the candidate user information datum and the prior user information data correspond to a user such that the known user and the unknown user are the same user.

14. The apparatus of claim 13, wherein the first behavioral pattern is one of a first plurality of behavioral patterns, and wherein the second behavioral pattern is one of a second plurality of behavioral patterns.

15. The apparatus of claim 14, wherein the processor is further configured to execute the steps of:

determining redundant information data based on the first plurality of behavioral patterns;

constructing a plurality of data features, wherein each data feature of the plurality of data features corresponds to a redundant information datum of the redundant information data; and generating a prediction model based on the constructed plurality of data features, wherein determining whether the candidate user information datum and the prior user information data correspond to the same user is further based on the prediction model.

16. The apparatus of claim 14, wherein the processor is further configured to execute the step of computing statistical properties of the prior user information data and the candidate user information datum based on the first and second pluralities of behavioral patterns, wherein determining whether the candidate user information datum and the prior user information data correspond to the same user is further based on the statistical properties.

17. The apparatus of claim 14, wherein the prior user information data comprises user information data on a plurality of websites that comprise at least one social media site, and the first plurality of behavioral patterns are identified based on the user information data on the plurality of websites.

18. The method of claim 1, wherein the step of identifying a first behavioral pattern comprises training a training function using the plurality of usernames corresponding to a known user.

19. The computer program product of claim 7, wherein the step of identifying a first behavioral pattern comprises training a training function using the plurality of usernames corresponding to a known user.

* * * * *